… … …

United States Patent Office 3,652,593
Patented Mar. 28, 1972

3,652,593
OXA-THIA-BICYCLO[3.3.0]OCTADIENES
Fritz Gautschi, Sous-chez-Troppet, Commugny, Vaud, Switzerland; Bruno Willhalm, 45 ch. du Petit-Bel-Air, Chene-Bourg, Geneva, Switzerland; and George H. Buchi, 100 Memorial Drive, Cambridge, Mass. 02142
No Drawing. Filed Dec. 23, 1969, Ser. No. 887,776
Claims priority, application Switzerland, Dec. 27, 1968, 19,288/68
Int. Cl. A23l *1/22;* C07d *63/18*
U.S. Cl. 260—332.3 H                8 Claims

ABSTRACT OF THE DISCLOSURE

New heterocyclic compounds containing oxygen and sulphur and including 2 - methyl - 3-oxa-8-thiabicyclo-[3.3.0]1,4 - octadiene, 2 - oxa-7-thiabicyclo[3.3.0]5,8-octadiene and its 8-methyl and 6,8-dimethyl derivatives, and methods for the preparation of these compounds, and their use as flavouring agents in imitation flavours and in foodstuffs, beverages, animal feeds, pharmaceutical preparations and tobacco products.

SUMMARY OF THE INVENTION

The invention relates to new bicyclic compounds of formula

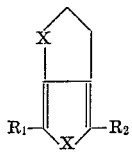

I wherein one of the symbols X represents oxygen and the other sulphur and $R_1$ and $R_2$ are hydrogen or methyl radicals.

The invention also relates to methods for the preparation of compounds I, of some of their intermediates and to the use of compounds I as flavouring agents or flavouring additives in the manufacture of artificial flavours for foodstuffs in general, beverages, pharmaceuticals and tobacco.

DESCRIPTION OF THE PREFERRED EMBODIMENTS

The compounds of the invention possess very powerful flavouring properties. In the pure state they develop a violent pungent sulphury odour which is no indication of their ability to be used as flavouring agents. It was discovered, however, that under suitable conditions of dilution the compounds of the invention develop pleasant tasty roasted, toasted and smoky notes which make them usable advantageously in the manufacture of flavours for foodstuffs, beverages, animal feeds, pharmaceutical preparations and tobacco. They can be used either independently or together with other flavour ingredients to improve or to modify the organoleptic properties of artificial or natural flavours of various kinds. For instance, the compounds of the invention can be used advantageously for preparing, improving or modifying flavours or flavouring compositions such as of nut, hazelnut, pecan, pistachio, candy, chocolate, cocoa, coffee, burnt sugar, roasted cereal, meat, spice flavours and many others.

The proportions in which the new compounds can be used to produce desirable flavouring effects can vary within wide limits. Because of their unusual flavouring power, the incorporation of very minute amounts of the new compounds in foodstuffs, beverages or flavouring compositions may already be of significance in some cases. For instance, quantities in the range of 1 to 20 mg. for 100 kg. of material to be flavoured (0.001 to 1 p.p.m.) can be sometimes sufficient to produce a marked effect. However, depending on the nature of the substances to be flavoured, it may be advantageous to use higher ratios of the new flavouring compounds, for instance in the order of 1 to 10 p.p.m. Except for special cases, for instance the preparation of flavour concentrates, it is preferable to avoid adding too much of the new compounds to foodstuffs or beverages as this might impart too strong burnt notes to the latter. The special cases mentioned thereabove concern the manufacture of unfinished products such as for instance concentrates or modifiers which should normally be diluted before use with tasteless inert solvents or other flavouring components.

The new compounds of the invention can also be used in the form of diluted solutions (for instance 1 to 10%) in edible solvents in order to decrease their relative flavouring strength and to insure an easier distribution in the materials to be flavoured. Solvents such as for instance propylene glycol, triacetin, benzyl alcohol and tasteless oils such as pure peanut oil can be used for such purpose. Solutions of the new compounds in such solvents represent also a subject of the present invention. Generally, these solutions are used in combination with other flavouring ingredients for the manufacture of flavouring compositions. In such compositions, the concentrations of the new compounds I can vary between approximately 10 and 1000 p.p.m. by weight.

The new compounds I or their solutions can be used either alone or together with other flavour ingredients to flavour a variety of foodstuffs and beverages. For example they can be used to flavour creams, ice-creams, puddings, jellies, pastries, confectioneries and milk-products such as milk, cream of milk, cottage cheese and yogurt. They can also be used for producing imitation coffee flavours and compositions which are useful as enhancers for instant coffee products.

Furthermore, together with other flavouring substances they can be used in the preparation of flavouring concentrates which themselves can be used directly or after dilution with edible solvents.

Some examples described hereinafter illustrate in more details the use of the new flavouring compounds.

According to the invention a process for the preparation of 2-methyl-3-oxa-8-thiabicyclo[3.3.0]1,4-octadiene comprises cyclising 2-acetyl-3-methoxymethyl-3-hydroxytetrahydrothiophene II by means of an acidic reagent (see scheme hereinbelow) according to known cyclisation methods. Conventional acidic reagents such as for instance mineral or organic acids can be used in the above process. Acids such as for instance sulphuric, phosphoric, hydrochloric, perchloric, oxalic, citric, tartaric, trichloracetic, trifluoracetic acids and others can be used. The acids can be used in the presence of water as a diluent or other solvents such as for instance ethanol, methanol, isopropanol, tetrahydrofuran, dioxan, monoglyme, methylcellosolve. The cyclisation can be carried out at a temperature which can be varied between wide limits. For instance a usable interval is 20 to 150° C. However at the low temperatures of this range, the reaction may be too slow to be practical and at temperatures higher than the boiling temperature of the reaction medium, the cyclisation should be carried out under pressure. Preferably, the cyclisation is carried out under the conditions of a steam distillation; the reaction temperature is, therefore, preferably in the vicinity of 100° C. at atmospheric pressure.

The intermediate II, which is a new compound, is prepared from 2-acetyl-3-ketotetrahydrothiophene by a Grignard reaction with a methoxymethyl magnesium halide, e.g. chloride or bromide, followed by hydrolysis with aqueous ammonium chloride. The above reaction can be carried out under usual Grignard reaction conditions in the presence of a variety of ether solvents such as for instance diethylether, tetrahydrofuran, diglyme, monoglyme and the like. However, methylal (dimethoxy methane) is preferred.

2-acetyl-3-ketotetrahydrothiophene can be prepared by acetylation of 3-ketotetrahydrothiophene according to usual means. The scheme below illustrates the successive processes described hereinabove.

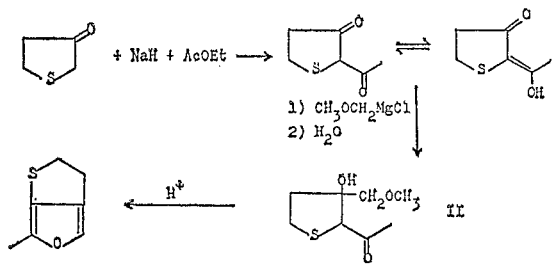

A process for the preparation of 2-oxa-7-thiabicyclo-[3.3.0]5,8-octadiene comprises cyclising and simultaneously demethoxycarbonylating a compound of formula

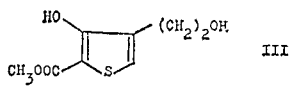

by pyrolysis. This pyrolysis requires a temperature above 200° C. and preferably between 300 and 400° C. under an inert atmosphere to prevent possible decomposition.

Compound III can be prepared by analogy to Chem. Ber. 88 (1955), 136 according to the following scheme

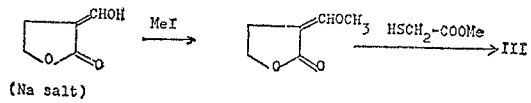

According to the invention a process for the preparation of 8-methyl-2-oxa-7-thiabicyclo[3.3.0]5,8-octadiene and 6,8-dimethyl-2-oxo-7-thiabicyclo[3.3.0]5,8-octadiene comprises methylating 2-oxa-7-thiabicyclo[3.3.0]5,8-octadiene in order to obtain a mixture of the mono- and di-methyl derivatives. The mono- and the di-methyl derivatives can be separated from the said mixture by usual means, e.g. fractional distillation or preparative vapour phase chromatography.

Both mono- and di-methylation can be carried out simultaneously by usual means for instance by the use of successively a proton remover and a methylating agent. Proton removers such as strong inorganic or metal-organic bases, e.g. methyllithium, butyllithium, phenyllithium, NaH, sodamide, followed by methylating agents of formula MeX wherein X is a leaving group, can be used. For instance MeX can be methyl bromide, methyl iodide, methylsulphate and others.

In the following examples which illustrate the invention in a more detailed manner, the temperatures are given in degrees centigrades.

EXAMPLE 1

Flavouring composition

A basic flavouring composition A having a taste and flavour similar to those of walnut was prepared by mixing the following ingredients (parts by weight):

| | |
|---|---:|
| 3-methyl-1,2-cyclopentanedione | 50 |
| Furfuryl alcohol | 50 |
| Furfural | 10 |
| Diacetyl | 5 |
| Acetylmethyl carbinol | 30 |
| Benzyl alcohol | 100 |
| Propylene glycol | 755 |
| Composition A | 1000 |

After that, two experimental flavouring compositions B and C as well as a control composition T were prepared in the following manner (parts by weight):

| | B | C | T |
|---|---:|---:|---:|
| Basic composition A | 100 | 100 | 100 |
| 2-methyl-3-oxa-8-thiabicyclo[3.3.0]1,4-octadiene, 1% sol.* | 25 | 50 | |
| Propylene glycol | 875 | 850 | 900 |
| Total | 1,000 | 1,000 | 1,000 |

* In propylene glycol.

Hereafter mixtures B, C and T were used for flavouring those foodstuffs the preparation of which is indicated below in doses stated in g./100 kg. of foodstuff:

| | |
|---|---:|
| Ice-cream | 100–150 |
| Cake | 200 |
| Pudding | 100–150 |
| Milk chocolate | 250 |

Ice-cream.—An ice-cream mixture was prepared from 1 litre of milk, 5 egg yolks and 250 g. of sugar in the following manner: The milk was heated, the sugar and the egg yolks were mixed and the hot milk was added to the mixture while stirring. Stirring was continued until the mass thickened, and the flavour was added. The mixture was then frozen in the usual manner.

Cake.—The following ingredients were intimately mixed: 100 g. of vegetable margarine, 1.5 g. of NaCl, 100 g. of sucrose, 2 eggs and 100 g. of flour. The flavour was added and the mass was cooked in the oven for 40 minutes at 180°.

Pudding.—A mixture of 60 g. of sucrose and 3 g. of pectin was added to 500 ml. of hot milk, while stirring. The mixture was brought to the boil for a few seconds, the flavour was added and the mixture allowed to cool.

Milk chocolate.—The content of 5 bars of 100 g. commercial milk chocolate was heated at a low temperature. When the mass thickened (45°), the flavour was added and the mass was cooled quickly to 28°. Then the temperature was raised to 32° and the chocolate poured into moulds.

The foodstuffs prepared as described above were then tasted by a panel of experienced tasters who had to express their opinions on the taste and flavour of the said foodstuffs. They all agreed that the foodstuffs flavoured with compositions B and C possessed an enhanced taste as compared with those flavoured with composition T. The note imparted by B and C was more roasted and more toasted than that imparted by T, C giving a definitely more pronounced effect than B.

When replacing in the above example 2-methyl-3-oxa-8-thiabicyclo[3.3.0]1,4-octadiene by 2-oxa-7-thiabicyclo[3.3.0]5,8-octadiene, 8-methyl-2-oxa-7-thiabicyclo[3.3.0]5,8-octadiene or 6,8-dimethyl-2-oxa-7-thiabicyclo[3.3.0]5,8-octadiene, similar results were obtained.

EXAMPLE 2

Flavouring of instant coffee

A coffee base was prepared by dissolving relatively bland tasting commercially available spray-dried coffee in boiling crystal spring water. The base solution contained 16 g. of instantly soluble coffee per liter of water. The container used (preferably the lower portion of a glass coffee maker) was absolutely clean as were the cups and hardware used.

The test samples were prepared by adding 5 to 15 μl. of a 1% solution of 2-methyl-3-oxa-8-thiabicyclo[3.3.0]5,8-octadiene in isopropanol to 225 ml. of coffee base. The mixture of coffee solution and flavour was immediately stirred and poured into tasting cups. The controls were filled with coffee base containing no flavour added. The tasting was done within the next 15 min. after filling the cups.

The tasting was done by a group of experienced tasters who practically unanimously declared that the coffee samples that contained the flavour added had a more natural taste than the controls and had a woody note reminding of coffee grounds. The preferred range of added flavour was 8–10 µl.

EXAMPLE 3

Preparation of 2-methyl-3-oxa-8-thiabicyclo[3.3.0]1,4-octadiene (a) 2-acetyl-3-keto-tetrahydrothiophene.—1.32 g. (38 mmoles) of sodium hydride, the protective mineral oil of which had been carefully washed off, were suspended in 20 ml. of monoglyme (dimethoxy-ethane) in an atmosphere of nitrogen. 3.06 g. (30 mmoles) of 3-keto-tetrahydrothiophene, prepared according to J. Am. Chem. Soc. 79, 1972 (1957), were added dropwise at 0° within 15 minutes. When the evolution of hydrogen had ceased, 10 ml. of ethyl acetate were added while stirring. Stirring was continued for 1 hour at 5° and then for 1 hour at room temperature. The mixture was decomposed with ice and 20 ml. of 2 N $H_2SO_4$. It was then extracted twice with ether and the extract was washed with successively concentrated NaCl and $NaHCO_3$ solutions. After the usual treatment, 1.08 g. (25%) of acetylated tetrahydrothiophenone, B.P. 43–47°/0.2 torr, having, according to gas-chromatographic analysis, a purity of about 85%, were obtained by distillation.

(b) 2 - acetyl - 3 - methoxymethyl - 3 - hydroxytetrahydrothiophene.—3.84 g. (0.16 gram-atom) of magnesium turnings were suspended in 30 ml. of methylal in an atmosphere of nitrogen. After the addition of a few crystals of mercuric chloride, 13 g. of chloromethyl methyl ether were added dropwise. After addition of the first drops, the reaction was controlled by means of a bath of solid carbon dioxide/acetone in such a way as to keep the temperature of the mixture at −5° during the remaining addition of the chlorinated compound. The temperature was then lowered to a temperature comprised between −40 and −50° whereupon a solution of 5.65 g. (39.2 mmoles) of 2-acetyl-3-keto-tetrahydrothiophene in 50 ml. of dry methylal was added dropwise (within ½ hour). After stirring for 2 more hours and allowing the temperature to progressively rise to 20° the reaction mixture was poured into an ice-cold aqueous solution containing 20 g. of $NH_4Cl$, extracted with ether and treated as usual. After distillation 3.72 g. (50%) of 2-acetyl-3-methoxymethyl-3-hydroxytetrahydrothiophene, B.P. 90–95°/0.2 torr, purity 70–75%, were thus obtained.

(c) Cyclisation of 2-acetyl - 3 - methoxymethyl-3-hydroxytetrahydrothiophene.—While steam distilling, 3.9 g. of the keto-hydroxyether, prepared according to the method described in paragraph (b), were added within a period of 60 minutes to 200 ml. of 1 N $H_2SO_4$. The condensate was extracted 3 times with hexane and, after the usual treatment, 0.43 g. of 2-methyl-3-oxa-8-thiabicyclo[3.3.0]1,4-octadiene, B.P. 105–107°/20 torr were obtained.

EXAMPLE 4

Preparation of 2-oxa-7-thiabicyclo[3.3.0]5,8-octadiene (a) α-Methoxymethylene butyrolactone.—A solution of the sodium salt of α-hydroxymethylene butyrolactone in absolute methanol containing a slight stoichiometric excess of methyl iodide was heated to its boiling temperature. After the usual treatment 17% of the desired product in the form of a colourless oil, B.P. 135–138°/11 torr were obtained. Mass spectrum: 99, 70, 128.

(b) 2 - methoxycarbonyl - 3 - hydroxy - 4 - hydroxyethylthiophene III.—11 mmole of sodium methoxide were suspended in 3 ml. of benzene and to this suspension 8 mmole of methyl thioglycolate and 8 mmole of the compound prepared according to the description given above, paragraph (a), were successively added. The reaction mixture was boiled for 1½ hr. and after the usual treatment 2-methoxycarbonyl - 3 - hydroxy-4-hydroxyethyl-thiophene in 58% yield, B.P. 128–133°/0.05 torr, was obtained. Mass spectrum: 139, 202,140.

(c) Pyrolysis of 2-methoxycarbonyl - 3 - hydroxy-4-hydroxyethylthiophene.—A solution of 3 g. of the compound prepared according to the above paragraph (b) in 30 ml. of benzene was introduced within ½ hr. into a tube filled with glass pearls and heated at 350°. The mixture obtained at the outlet of the pyrolysis tube was distilled. 0.315 g. (17%) of the desired bicyclic compound were thus obtained. It was purified by column chromatography (alumina G) and elution with a mixture 2:3 (v./v.) of benzene-hexane. Mass spectrum: 126, 97, 53.

EXAMPLE 5

Preparation of 8-methyl- (and 6,8-dimethyl-) -2-oxa-7-thiabicyclo[3.3.0]5,8-octadienes 1.6 mmole of 2-oxa-7-thiabicyclo[3.3.0]5,8-octadiene prepared according to Example 4, dissolved in 1 ml. of absolute ether, were allowed to react with 1.6 mmole of butyl lithium in 1.1 ml. of hexane. The mixture was refluxed for 2 hr., then cooled to 0°. At this temperature a solution of 0.202 g. of dimethyl sulphate in 1 ml. of ether was added. The reaction mixture was left stirring overnight, and the usual treatment gave a mixture containing approximately 10% of starting product, 70% of monomethylated product and 20% of dimethylated product. The components were separated by preparative vapour-phase chromatography. The results of the mass spectroscopic analysis are the following: Monomethylated product: 140, 59, 139. Dimethylated product: 154, 153, 59.

We claim:
1. A compound having the formula

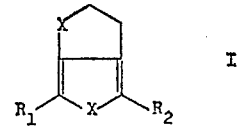

wherein one of the symbols X represents oxygen and the other sulphur and $R_1$ and $R_2$ are hydrogen or methyl radicals.

2. 2-methyl - 3 - oxa-8-thiabicyclo[3.3.0]1,4-octadiene.
3. 2-oxa-7-thiabicyclo[3.3.0]5,8-octadiene.
4. 8-methyl-2-oxa-7-thiabicyclo[3.3.0]5,8-octadiene.
5. 6,8-dimethyl-2-oxa-7-thiabicyclo[3.3.0]5,8-octadiene.
6. Process for the preparation of 2-methyl-3-oxa-8-thiabicyclo[3.3.0]1,4-octadiene which comprises cyclising 2-acetyl-3-methoxymethyl-3-hydroxytetrahydrothiophene of

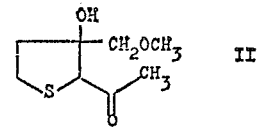

by means of a mineral or organic acid.

7. The process of claim 6, wherein the acid is sulphuric, phosphoric, hydrochloric, perchloric, oxalic, citric, tartaric, trichloracetic, or trifluoracetic acid.

8. The process of claim 6, wherein the cyclisation is carried out between 20 and 150° C. and under the conditions of a steam distillation.

References Cited

UNITED STATES PATENTS 2,758,118   8/1956   Hause _____ 260—346.1

HENRY R. JILES, Primary Examiner

C. M. SHURKO, Assistant Examiner

U.S. Cl. X.R.

99—24, 65, 92, 136, 139, 140; 260—332.2 C, 332.3 C, 332.3 R, 343.6, 347.8